June 18, 1946.   C. M. COLLINS   2,402,239
ELECTRICAL CONTROL FOR STANCHIONS FOR DAIRY CATTLE BARNS
Filed March 7, 1945

INVENTOR.
CLYDE M. COLLINS
BY J. Federmann
ATTORNEY

Patented June 18, 1946

2,402,239

UNITED STATES PATENT OFFICE 2,402,239

ELECTRICAL CONTROL FOR STANCHIONS FOR DAIRY CATTLE BARNS

Clyde M. Collins, Willamina, Oreg.

Application March 7, 1945, Serial No. 581,505

3 Claims. (Cl. 119—148)

This invention relates to cattle barn stanchions, and aims to provide a novel and practical mechanism, electrically operated, for opening the stanchions to release all the cattle simultaneously, and vice versa to close all the stanchions simultaneously to lock the cattle therein. Thereby a considerable amount of time and labor are saved. The device may be operated on any voltage, and the invention may be applied to either factory built or home made stanchions.

The above broad as well as additional and more specific objects will become apparent in the following description, wherein characters of reference refer to like-numbered parts in the accompanying drawing. It is to be noted that the drawing is intended for the purpose of illustration only, and that it is neither desired nor intended to limit the scope of the invention to any or all of the specific details of construction illustrated excepting insofar as they may be deemed essential to the invention.

Referring briefly to the drawing.

Figure 5:
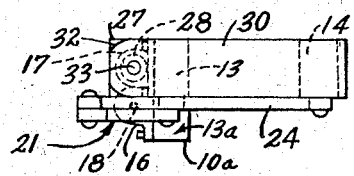
Fig. 5 is a plan view of Fig. 1.

Referring in detail to the drawing, the numeral 10 indicates generally the home made type of stanchion and the numeral 11 the factory built type. The former comprises the rigid base or base member 12 having the rigid upright member or arm 13 extending therefrom and a substantially similar arm 14 pivoted to the base 12 forward of the arm 13. The arm 13 has its upper portion of the same thickness as the arm 14, but the lower portion below the horizontal shoulder 13a, indicated by the numeral 10a, is, as shown in Fig. 5, of increased thickness to accommodate the solenoid 16 in the desired position forward of the solenoid 17, as clarified below. Of course any other structure or arrangement, not shown, might be provided instead of the shown, for the same purpose. A spring or the like 15, deformed substantially as shown, is anchored to the arm 13 and normally urges the arm 14 to swing outward on its pivot.

A pair of solenoids 16 and 17 are mounted with their axes vertical and they may be positioned as shown, the solenoid 16 lying below and forward of the solenoid 17. The armature 18 of the former has a link 19 pivoted to its extremity, and the other end of the link 19 is pivoted to the shorter arm 20 of a bell crank 21, the bell crank being pivoted to the stanchion arm 13 at 22. In the extremity of the longer bell crank arm 23 a rod 24 has one end pivoted, the other end of the rod, 25, being pivoted to the pivoted stanchion arm 14.

Figure 1:
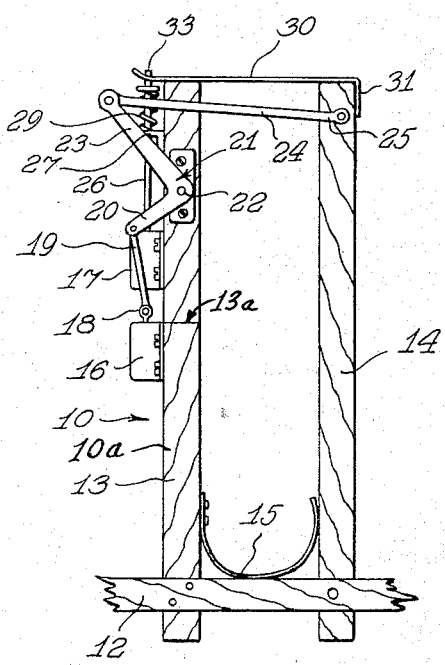
Fig. 1 is a front elevational view of a single stanchion in locked condition.
Figure 2:
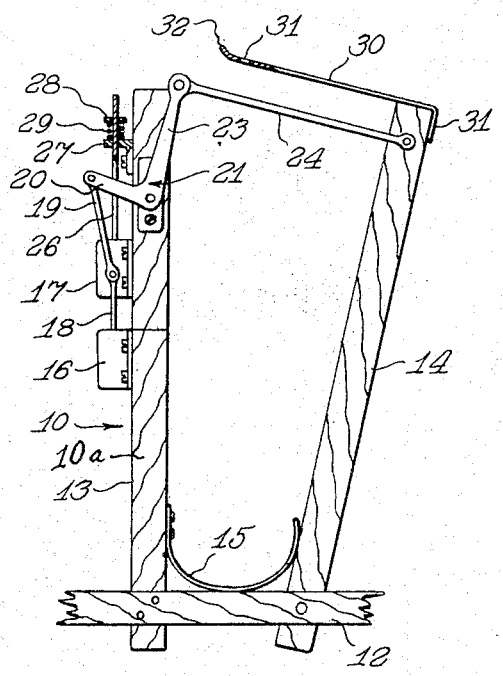
Fig. 2 is a similar view showing the stanchion in open condition.

The other solenoid 17 has its armature 26 extending slidably through an opening in a horizontal rigid guide 27 and is provided with a rigid collar or washer 28 near its extremity. A coiled spring 29 surrounds the armature 26 between the guide 27 and the collar 28 and normally urges the armature 26 upward. A band-like yoke 30 has one end 31 secured to the top of the stanchion arm 14 and the other end provided with an opening 31 therethrough, its extremity 32 being slightly curved upward. Normally when the stanchion is closed as shown in Fig. 1 the extremity 33 of the armature 26 registers in the yoke opening 31 and prevents the yoke arm 14 from being swung outward by the spring 15, thereby not only keeping the stanchion closed but also releasably locking it in closed position.

Figure 4:
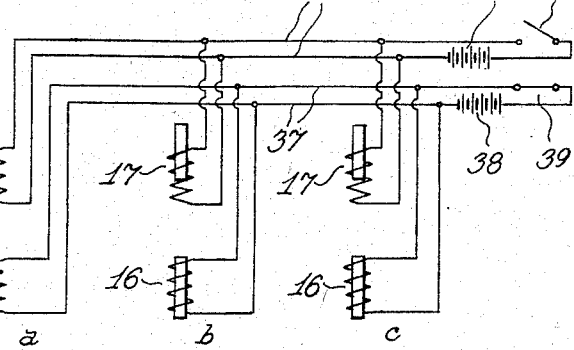
Fig. 4 is a wiring diagram indicating the manner of opening or closing all the stanchions simultaneously.

In the wiring diagram of Fig. 4, the electrical connections of three similar stanchions are shown at a, b, and c, but of course any other number of stanchions may be used. The solenoid 17 is connected in circuit with a source of supply represented by the battery 34 through the leads 35 and the switch 36. The additional solenoids 17 of the additional stanchions are connected in parallel with the solenoid 17 of the stanchion represented at a. Likewise, the series of solenoids 16 are connected in parallel through leads 37 with a source 38 (which would of course be the same source as 37 in actual use) and a switch 39. With the switch 39 closed as shown in Fig. 4 and the switch 36 open, the stanchions would all be in closed condition as shown in Fig. 1. If switch 39 is then opened after switch 36 has first been closed, the stanchion arm 14 will obviously be released by withdrawal of the armature 26 into the solenoid 17 and the arm 14 will be swung outward by the spring 15. Both switches are of course open excepting during the brief time of closing or opening the stanchions. As the stanchion arm 14 swings outward it rocks the bell crank 21 so that the armature 18 of the solenoid 16 is withdrawn, as is obvious. To close the stanchion the switch 39 is closed, causing retraction of the armature 18 by the solenoid 16 and hence causing the bell crank to swing the stanchion arm 14 back into closed position. Just before it reaches this position the upturned tip 32 of the yoke 30 will ride over the extremity 33 of the armature 26 and force the latter downward against its spring 29 until the extremity 33 passes through the opening 31 to latch the yoke in closed position.

Obviously the entire series of stanchions similar to the one described will thus open and close simultaneously, and the consequent saving of labor and time is obvious.

Figure 3:
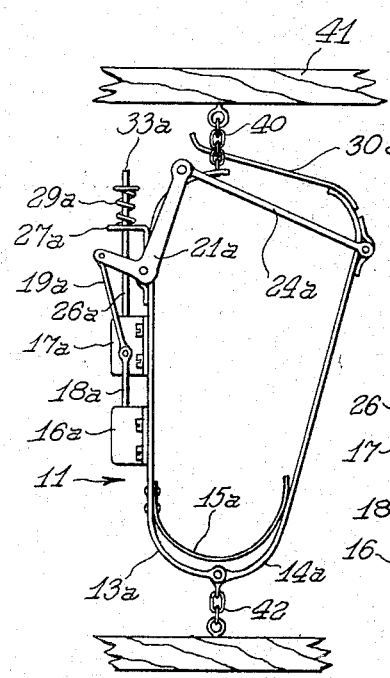
Fig. 3 is a front elevational view of a modified form of the stanchion with the device applied thereto, in closed condition.

In the so-called factory built type of stanchion shown in Fig. 3, it is built of steel or iron and all the similar parts thereof as well as of the instant invention are indicated thereon by the same reference numerals followed by the letter $a$, and a clear understanding of the application of the invention to this form of stanchion is believed apparent without any detailed description.

The latter type of stanchion is supported by a chain 40 from a beam 41 and is anchored to the floor or base by a chain 42.

Obviously modifications in form and structure may be made without departing from the spirit and scope of the invention.

I claim:

1. In a stanchion comprising a base and a rigid upright member and a pivoted upright member spaced forward thereof, a solenoid mounted on said rigid member, a bell crank pivoted on said rigid member, a link joining one arm of said bell crank to said armature, a rod having one end pivoted to said pivoted member and the other pivoted to the other arm of said bell crank, a second solenoid on said rigid member, said pivoted member having a yoke secured thereon provided with an opening through the end thereof, a rigid guide on said rigid member having an opening therethrough, the armature of said second solenoid extending through said guide opening and having a rigid collar thereon near the extremity thereof, a coiled spring surrounding said second armature between said collar and said guide, said extremity of said second armature registering releasably in said yoke opening to lock said pivoted arm in closed position, and electrical means for energizing said solenoids.

2. The device set forth in claim 1, the free extremity of said yoke being curved upward.

3. The device set forth in claim 1, having a plurality of substantially identical stanchions constructed in accordance with said claim, each set of solenoids of said plurality of stanchions being connected in parallel with said electrical energizing means.

CLYDE M. COLLINS.